Sept. 12, 1961 R. C. DU BOIS 2,999,508
SUPPRESSION DEVICE FOR NARROW SPANS
Filed May 19, 1960 4 Sheets-Sheet 1

INVENTOR.
Robert C. DuBois
BY
ATT'YS.

INVENTOR.
Robert C. DuBois
ATT'YS.

Sept. 12, 1961 R. C. DU BOIS 2,999,508
SUPPRESSION DEVICE FOR NARROW SPANS
Filed May 19, 1960 4 Sheets-Sheet 3

INVENTOR.
Robert C. Du Bois
BY
ATT'YS.

Sept. 12, 1961        R. C. DU BOIS        2,999,508
SUPPRESSION DEVICE FOR NARROW SPANS
Filed May 19, 1960        4 Sheets-Sheet 4
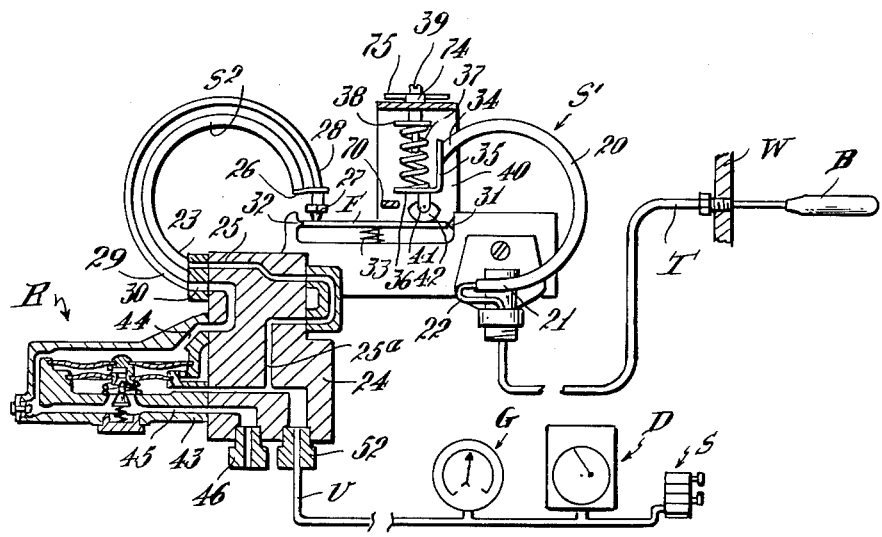
Fig. 5
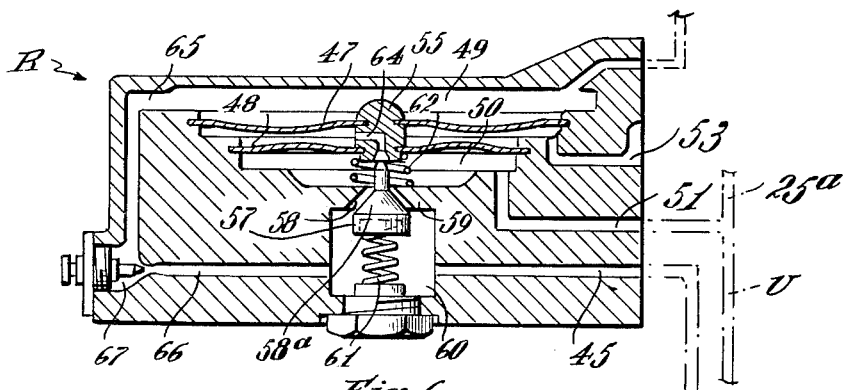
Fig. 6
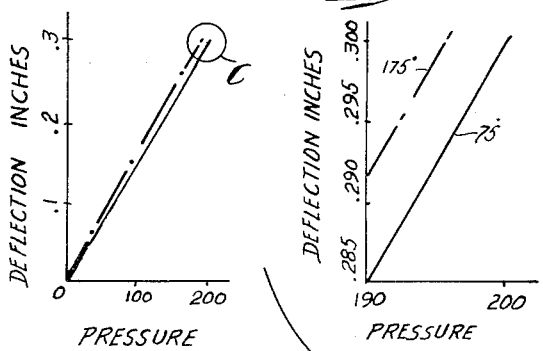
Fig. 7      Fig. 8
INVENTOR.
Robert C. Du Bois
BY
ATT'YS

United States Patent Office 2,999,508
Patented Sept. 12, 1961

2,999,508
SUPPRESSION DEVICE FOR NARROW SPANS
Robert C. Du Bois, Fairfield, Conn., assignor to Manning, Maxwell & Moore, Incorporated, Stratford, Conn., a corporation of New Jersey
Filed May 19, 1960, Ser. No. 30,288
13 Claims. (Cl. 137—85)

This invention pertains to pressure transmitters, more particularly to suppression means useful in a transmitter of the narrow span type.

The transmitter thus referred to is an apparatus designed to transmit variations in fluid pressure from a source to a pressure-sensitive receiver, which may be remote from the source, and wherein the actual pressure to which the receiver responds may be much less than the pressure at the source, but varies in a constant predetermined ratio with that at the source, and wherein the medium by means of which the pressure variations are transmitted, from the source to the receiver, is a fluid, for example compressed air.

Essentially such apparatus comprises an element, for example a Bourdon tube, which responds linearly to pressure variations at the source (for example, a pressure vessel in which there is a high but variable pressure), and wherein the motion of the tip of the Bourdon tube determines the operation of a feedback motor (which may be a second Bourdon tube), that, in association with an air relay, controls the fluid pressure in a transmission tube, leading from the vicinity of the source to the receiver.

Apparatus of the above type is useful, for instance, when, by reason of extremely high temperature at the pressure vessel or the dangerous character of the material involved in the processing, it is desirable that variations in pressure in the pressure vessel be indicated or recorded at a substantial distance from the pressure vessel. Apparatus of this general type is widely employed in industry.

The present invention is particularly concerned with a transmitter designed to operate at highly suppressed ranges, that is to say, to produce a full scale output change at the receiver in response to a relatively small range of variations in the pressure at the source. Under some circumstances, it is not necessary, nor desirable, that variations in pressure at the source be indicated, observable or recorded, except within a narrow span of the entire range of pressure, while on the other hand, it is desirable, for ease in observation, or otherwise that the indicator or equivalent element at the receiver, move over a wide range. This, for specific example, the pressure at the source, that is to say, the input pressure, may vary through a range whose upper limit is 200 p.s.i. although it is only necessary or desirable to observe variations within the range of from 190 p.s.i. to 200 p.s.i., while producing a full scale change at the receiver or indicator of from 3 to 15 p.s.i. According to customary prior practice, were one to design a transmitter to produce a full scale output reading at the receiver, corresponding to the narrow span of 190 p.s.i. to 200 p.s.i. at the source (that is, a 10 p.s.i. span), an input Bourdon tube would be selected such as to have as much tip travel as possible in the range of from 190 p.s.i. to 200 p.s.i. limited by the permissive stress in the tube and its size. For instance, let it be supposed that the selected Bourdon tube has a tip travel of 0.300″ for a pressure range of from zero to 200 p.s.i. With such an amount of tip travel of the input Bourdon tube for the full pressure range, its motion for the span of 10 p.s.i. would be $$\frac{0.300}{20} = 0.015''$$

While this is a small amount of motion to measure accurately, it is possible, with sufficient care, to design a transmitter capable of operating in response to motion of that order.

The next step (according to usual procedure in the transmitter design) would be to provide a feed-back Bourdon tube having an unusually heavy wall such that its tip travel would be approximately 0.015″ in response to the output pressure span of from 3 to 15 p.s.i. With the parts selected to accomplish this, the transmitter, otherwise generally conventional, may be calibrated accurately, at a given temperature, to produce an output pressure covering the range of 3 to 15 p.s.i. for an input pressure range of 190 to 200 p.s.i. Such a design would be simple and desirable were the apparatus exposed to constant temperature. However, apparatus such as just referred to would be subject to large errors due to changes in temperature of the transmitter, these errors being in proportion to the suppression ratio. (The suppression ratio is defined as the maximum pressure of the input divided by the pressure span which is to be measured, in the specific example given, $$\frac{200}{10} = 20)$$

For low suppression ratios, temperature errors are comparatively small. Thus transmitters operating at suppression ratios of the order of 2 or 3, for example, are reasonably satisfactory.

The reason for the temperature error is that the modulus of elasticity, E, of the Bourdon tube changes with temperature at a rate of approximately 2% per 100° F. This is the approximate figure for any of the common materials employed in the manufacture of Bourdon tubes. However a temperature change applies both to the input Bourdon tube and to the feed-back Bourdon tube, and because of the symmetrical construction of the transmitter, the errors in the two tubes tend to balance each other at low suppression ranges, for instance, such as from 0 to 60, 0 to 200 or 0 to 2,000 p.s.i. However, in a transmitter operating at a highly suppressed ratio and constructed in a conventional manner, the compensation of temperature errors does not occur because the temperature errors of the input tube are highly magnified. For example, with a suppression ratio of 20 to 1, as in the example above given, and employing a stainless steel Bourdon tube, it might be expected that the temperature error, as noted either in percent of the output pressure or as a percent of the span of the input pressure (10 p.s.i.) would be of the order of 40% for a 100° F. change in temperature, and such an error would obviously make the transmitter impractical for general use.

It has been proposed to provide temperature compensation in transmitters operating at high suppression ratio by employing, in the manufacture of the input Bourdon tube, a material such that the motion of the tip of the tube, in response to pressure variations, does not change with the temperature, that is to say, by using a material having a constant value for Young's modulus. There are not many materials available, and otherwise suitable, for making a Bourdon tube, which have a constant value for Young's modulus within the temperature range to which the input tube may be subjected. One such material having a substantially constant value for E is a commercially available alloy sold under the trade name Ni-Span C.

Ni-Span C is an alloy manufactured by International Nickel Company, Inc., of 67 Wall Street, New York 5, N.Y., and is defined as a constant modulus alloy comprising in percentage of essential elements, other than iron, the following:

| | |
|---|---|
| 41–43 Ni | 0.30–0.60 Mn |
| 2.2–2.6 Ti | 0.30–0.80 Sl |
| 5.1–5.7 Cr | 0.40–0.80 Al |
| 0.06 (max) C | 0.04 (max) P |
| | 0.04 (max) S |

However, this material has very limited resistance to corrosion and if the input tube of the transmitter is to be located in a situation where it is exposed either internally or externally, to corrosive fluids or vapors, the use of this material in making the Bourdon tube is impractical. Under such conditions, it becomes necessary to employ a material such as stainless steel or Monel which are resistant to corrosion, but neither of these materials has a constant value of E with reference to temperature changes.

A principal object of the present invention is to provide a transmitter of the above type, so designed that it becomes possible to employ an input Bourdon tube made of any desired material (for example stainless steel or Monel metal) which is resistant to corrosion, but with provision whereby the force required to provide the necessary suppression is supplied by means which has a substantially constant Young's modulus and which is not exposed to corrosive influences, making possible a practical transmitter of high suppression in which errors resultant from temperature variations are minimized.

A further object is to provide a high suppression transmitter of the above type capable of use under circumstances such that the input Bourdon tube, although internally exposed to corrosive fluid, may be made of a material resistant to corrosion but wherein, by means of a spring (which is not in contact with the corrosive substances) made from a material of substantially constant Young's modulus, such as the alloy Ni-Span C above referred to, the tube is so loaded as to provide the necessary suppression while substantially eliminating temperature errors.

A further object is to provide a high suppression transmitter wherein an input Bourdon tube of non-corrosive material provides the primary force for actuating a flapper valve but wherein motion of the tube tip in response to internal pressure variations is modified by an external spring of a material having a very low coefficient of temperature change of the modulus of elasticity. A further object is to provide a high suppression transmitter wherein an input Bourdon tube provides the primary force for actuating a flapper valve and wherein the tip of the tube is maintained at the point it would occupy at no pressure, until the internal pressure has risen to the lower limit of the suppression range, by a force which is substantially unaffected by temperature variation.

A further object is to provide a transmitter designed to operate at a suppression range of the order of 20 to 1, and wherein an input Bourdon tube has its tip so loaded by a spring that its tip is prevented from motion in response to internal pressure until the pressure has risen to the low limit of the suppression range, and wherein the loading spring is of a material having a substantially constant Young's modulus throughout the suppression range of the apparatus.

Other and further objects and advantages of the invention will be pointed out in the following more detailed description and by reference to the accompanying drawings wherein:

FIG. 5 is a diagrammic elevation, partly in section, illustrating the operative elements of the transmitter;

FIG. 6 is a vertical section to larger scale than FIG. 5, showing in greater detail an air relay such as may constitute one of the elements of the apparatus; and FIGS. 7 and 8 are graphic diagrams illustrative of the magnification of temperature error at high suppression in an instrument of this type.

Figures 1, 2:
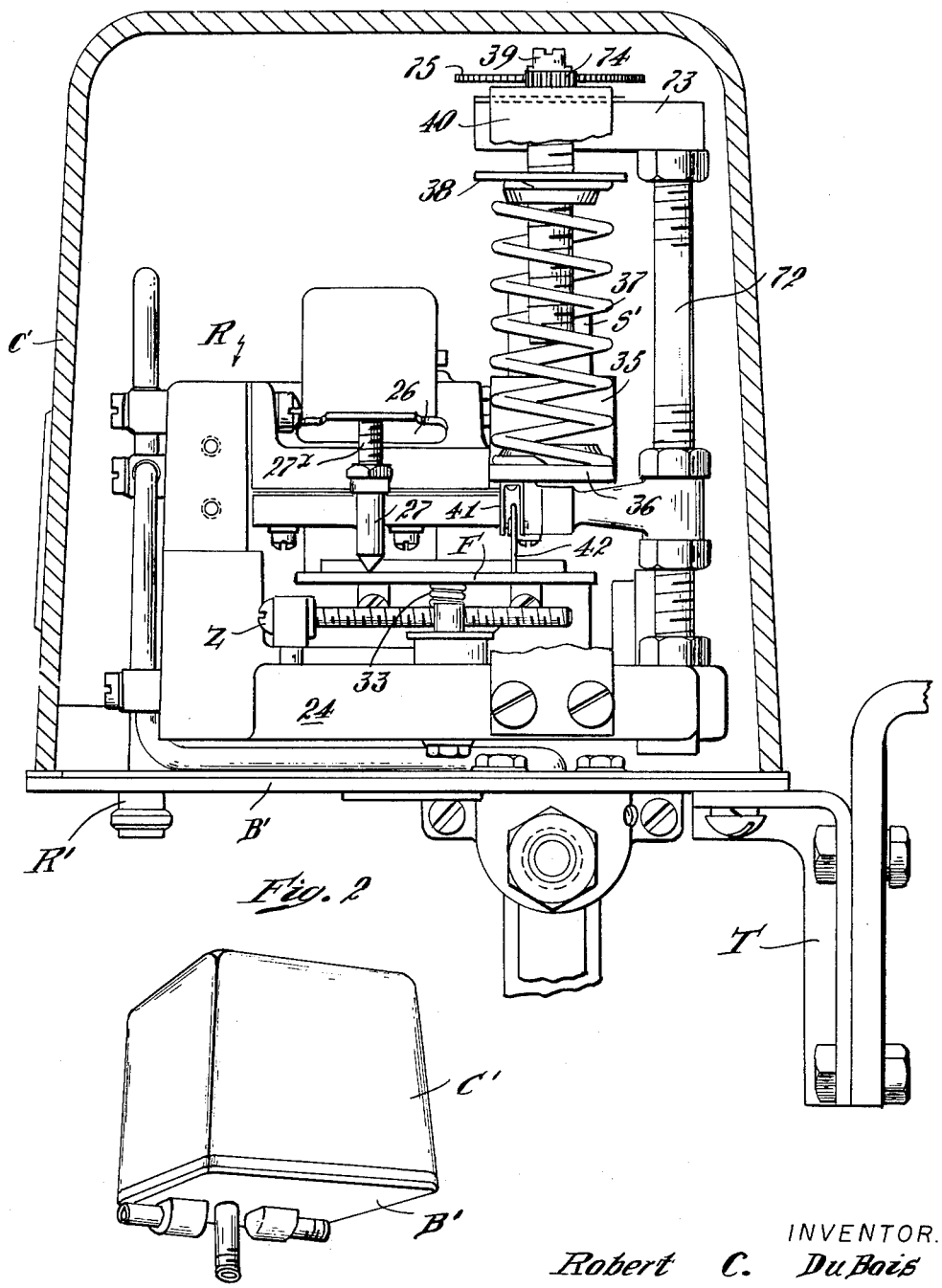
FIG. 1 is a perspective view to small scale, illustrating the general external appearance of a transmitter embodying the present invention.
FIG. 2 is a front elevation to larger scale than FIG. 1, showing the transmitter with the cover sectioned.
Figure 3:
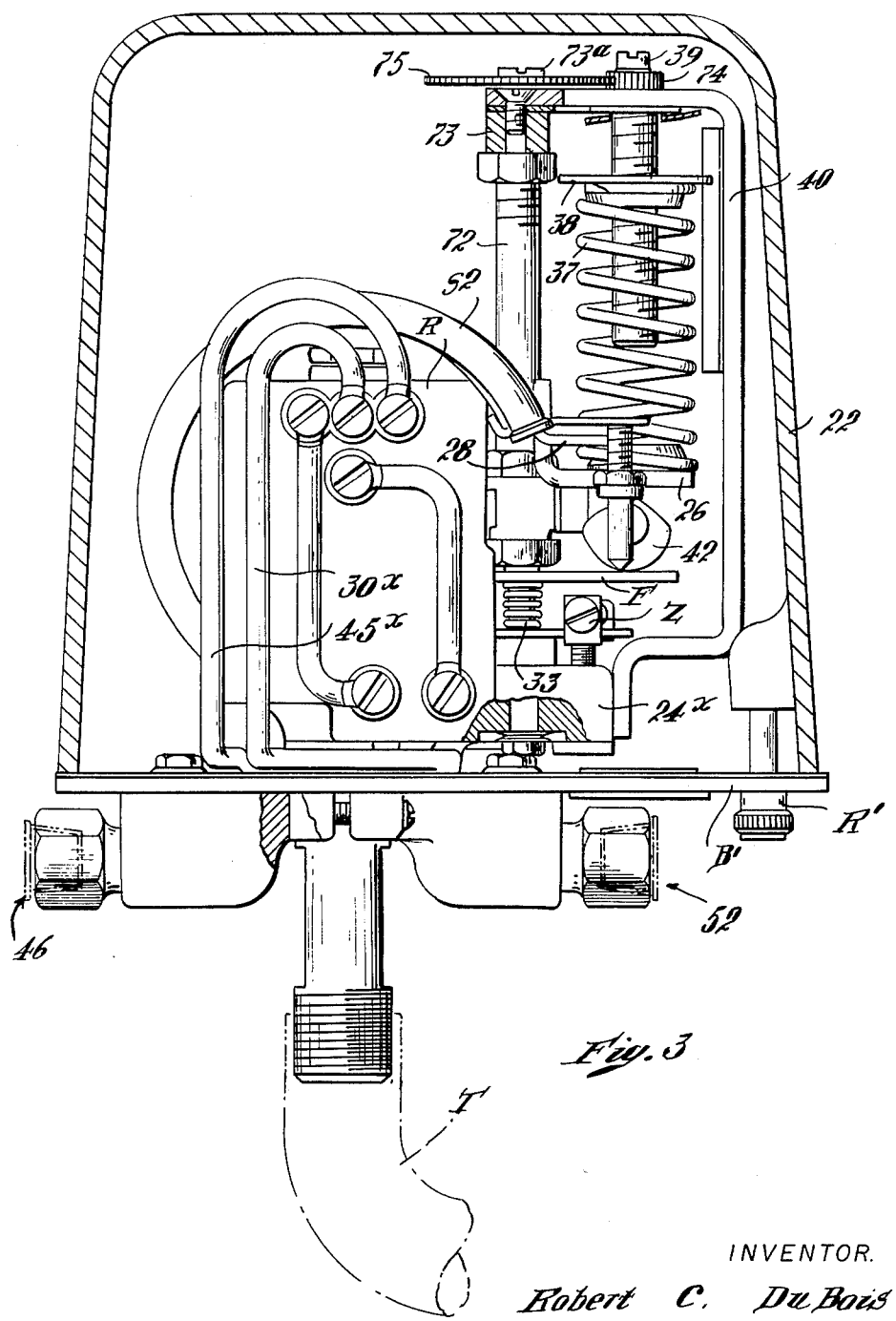
FIG. 3 is a left hand side elevation, showing the transmitter with portions shown in vertical section.

Reference has hereinabove been made to the magnification of temperature error at high suppression ratios and for an explanation of this phenomenon, reference may be made to FIGS. 7 and 8 of the drawings. FIG. 7 is a graphic representation of the normal, linear relationship between the deflection of the tip of an input Bourdon tube and the input pressure. In this view it is assumed that at room temperature a pressure change of from zero to 200 p.s.i. results in a deflection or tip travel of the tube of 0.3″. In this view, the solid diagonal line is a graph representing the relation between pressure and deflection at a room temperature of 75° F. In the same view, the broken line is a graph indicating the relation between pressure and deflection at a temperature of 175° F., that is to say, a difference of 100° F. It will be observed that the increase in temperature results in a progressively greater deflection or tube travel for a given pressure variation. This is due to the lower value of Young's modulus at the higher temperature. In a conventional range, non-suppressed transmitter, calibrated from zero to 200 p.s.i. this increase in tube travel, due to temperature change would be largely compensated by a similar increase in the tip travel of the feed-back Bourdon tube system, as the transmitter operates to maintain a substantially constant ratio between the tip travels of the two Bourdon tube systems, and little or no error results due to change in temperature because both Bourdon tubes tend to become weakened at approximately the same rate. In a highly suppressed transmitter, such as the example above given, that is one having a suppression range of 20 to 1, the only portion of the pressure deflection curve (FIG. 7) which would be of interest would be that which corresponds to the pressure span of from 190 to 200 p.s.i. FIG. 8 shows this portion only of the graph of FIG. 7 magnified 20 times, the part of the graph of FIG. 7 which is enclosed in the small circle being the same as that which is shown in FIG. 8, wherein a small arc of the large circle is indicated at C1. A study of FIG. 8 will show, from the comparison of slopes of lines representing 75° F. and 175° F. that the slight change in slope of the two lines is comparatively unimportant as compared with the vertical displacement of the two graph lines. Thus, in prior transmitters, operating at a suppression range of 20 to 1 and adjusted to a temperature of 75° F. to produce the full output pressure range for the input pressure span of 190 to 200 p.s.i. (that is for a change in the deflection of the input Bourdon tube of 0.015″) there would be a very substantial error in response to a temperature increase to 175° F. and the deflection of the input Bourdon tube would be in very substantial error in response to the temperature increase to 175° F., and the deflection of the input Bourdon tube would be in error by approximately 40% of the measured displacement of 0.015″. It is for the purpose of avoiding such temperature error that the apparatus of the present invention was conceived and designed.

Referring to the drawings and, in particular, to FIG. 5, in which the various essential elements of the apparatus are shown diagrammatically and without attempt to illustrate structural details, the character W designates a portion of the wall of a chamber in a vessel which contains the substance whose variations in pressure or temperature are to be transmitted in accordance with a predetermined ratio to a receiver which may be located at a substantial distance, for example as much as 1,000 feet from the apparatus herein specifically described.

One end of a tube T is secured to the wall of the vessel. If the contents of the vessel are fluid, and its pressure is to be indicated or recorded, the tube may open directly into the vessel so that the fluid contents of the vessel may enter the tube. If the temperature within the vessel, rather than pressure, is to be indicated or recorded, a bulb B of fixed dimensions may be attached to the inner end of the tube and the bulb and tube filled with a fluid having a high coefficient of temperature expansion. If the contents of the vessel be highly viscous or otherwise incapable of free flow, a capsule may be connected to the inner end of the tube, said capsule being of a type such that its interior volume varies in accordance with variations in external pressure, and the tube and capsule filled with a suitable liquid. The tube T leads to the input Bourdon tube system $S^1$, comprising the Bourdon tube 20 whose lower end 21, as here shown, is fixed in a conventional supporting bracket with the end portion 22 of the tube T connected leak-tight to the fixed end 21 of the Bourdon tube.

In accordance with the present invention the Bourdon tube 20 may be of stainless steel or Monel metal, or other material which is highly resistant to corrosion. The employment of such material makes it possible, if desired, to permit process fluid contained within the receptacle W to pass directly through the capillary tube T to the interior of the Bourdon tube. It is possible, and often desirable, to bring the process fluid directly to the Bourdon tube without the use of a capillary line.

The feed-back Bourdon tube is indicated by the character $S^2$, its fixed lower end 23 being suitably mounted on a block 24 having therein a passage 25 which communicates at one end with the Bourdon. The opposite end of the Bourdon tube $S^2$, that is to say, its movable tip, is fixed leak-tight to a bracket 26 to which is attached the nozzle member 27. A capillary tube 28 has one end fixed to the bracket 26 and at this end communicates with the delivery passage in the nozzle 27. The other end 29, of the tube 28, is fixedly attached to the block 24 and communicates with a passage 30 in the block. While the tube 28 is herein illustrated, for ease in description, as outside the Bourdon tube $S^2$, it is found desirable, in practice, to place the tube 28 within the Bourdon tube $S^2$ with appropriate connections between the tube 28 and the passage 30.

The delivery end of the nozzle 27 is arranged directly above the flapper valve F, which is approximately semicircular in shape and which is pivotally supported near its straight edge, which is herein referred to as the rear edge, to swing about an axis defined by the pivot pins 31 and 32. A spring 33, underlying the forward part of this flapper valve tends to swing the valve upwardly so as to tend to press the valve against the delivery end of the nozzle 27 and thus reduce or cut-off the flow of air from the latter.

The flapper valve F is also so mounted that it may be turned about a vertical axis, thus changing the distance that the tips of the respective tubes $S^1$ and $S^2$ must travel to maintain the required air gap between the valve and nozzle. By reducing this distance for one tube, while increasing it for the other, the output air pressure may be balanced against the input pressure. No linearity adjustment is necessary.

In accordance with the present invention, the free end or tip 34 of the input Bourdon tube $S^1$ is provided with a bracket 35 having a horizontal flange 36 which forms an abutment for the lower end of a compression spring 37, the upper end of which bears against an abutment plate 38 having screw-threaded engagement with a rotatable screw 39, said screw having suitable bearings in a fixed bracket 40.

It has heretofore been proposed to load a Bourdon tube by means of a spring, thereby to change the spring characteristics of the tube itself, but in accordance with the present invention, the loading spring 37 is of such a nature as to compensate for any change in Young's modulus of the material of the Bourdon tube by reason of temperature changes. For this purpose, the spring 37 is made of a material having a substantially constant Young's modulus, for example the alloy known as Ni-Span C. Furthermore, the spring 37 is so compressed by the operation of the screw 39 as to hold the tip of the Bourdon tube $S^2$ in the position it would normally assume when free from any external load or from any superatmospheric internal pressure, until the internal pressure has risen to the lower limit of the selected pressure range, that is to say, in the example given, until the internal pressure reaches 190 p.s.i. Thus the force created by internal pressure, up to the pressure of 190 p.s.i., is carried solely by the stress in the spring 37 and does not require the Bourdon tube to provide this restraining force. Since the force required from the Bourdon tube to keep the tip location at that corresponding to 190 p.s.i. is essentially zero, and temperature changes have no affect upon the load imposed by the spring, the deflection of the tip of the Bourdon tube $S^2$, at 190 p.s.i., does not change with changes of temperature. Thus temperature compensation is provided and displacement of the deflection pressure curve, such as shown in FIG. 8 of the drawing is eliminated.

As the pressure within the Bourdon tube $S^1$ increases from 190 to 200 p.s.i., the tip of the tube moves upwardly, approximately 0.015″, which would be expected and the spring force of the Bourdon tube which starts to act essentially as though from zero, changes only at the rate of change of the modulus of elasticity, that is to say 2% per 100° F. Thus, change due to temperature increase is only what would be expected in a normal (non-suppressed) range transmitter and is largely compensated for by the approximately equal change in modulus of the Bourdon tube $S^2$.

The horizontal arm 36 of the bracket 35 has a downwardly directed yoke member 41 carrying a transversely extending pivot pin on which is mounted a segmental wheel 42 whose arcuate edge bears against the upper surface of the flapper valve F.

The block 24, above described, has associated therewith an air relay R comprising the block 43, which is secured leaktight against the left-hand side of the block 24, as shown in FIG. 5, and which has a fluid passage 44 which communicates with the passage 30 which leads to the nozzle 27.

This air relay R may be of a known or conventional type, but is here shown, for example, in detail in FIG. 6. As thus illustrated, this relay comprises the above block or housing 43 having therein a passage 45 which communicates with a conventional filter assembly 46 (FIG. 5) to which compressed air at a substantially constant pressure, for example, 20 pounds is supplied from any suitable source. The housing 43 has an interior chamber within which two spaced, concentric diaphragms 47 and 48 are arranged. The diaphragm 47, in cooperation with one wall of the diaphragm chamber defines a space 49 from which the passage 44 leads to the passage 30 in the block 24 and thus provides communication between the space 49 and the nozzle 27.

The chamber 50 between the diaphragm 48 and the opposite wall of the diaphragm chamber has an outlet passage 51 which communicates with a pipe or tube U, preferably with an interposed filter assembly 52, the pipe U being of small size and of a suitable length to reach to the remotely located gauge G, recorder D, pressureactuated switch S, or any other type of receiver designed to respond sensitively to pressure changes within the tube U. The passage 51 also communicates with a passage 25a in the block 24 which leads directly or indirectly to the passage 25 and thus to the interior of the feed-back Bourdon tube $S^2$. An exhaust port 53 leads to the outer atmosphere from the space 54 between the diaphragms 47 and 48. A combination motion-transmitting device and valve 55 connects the diaphragms 47 and 48 so that they are compelled to move as a unit and this device 55, at times, contacts a seat on a movable combined seat and valve member 57 which comprises a valve element 58a which, at times, engages a seat 58 defining a port in a septum 59 between the chamber 50 and a chamber 60 in the block of housing 43 to which the passage 45 leads. A spring 61 tends normally to hold the valve 58a against the seat 58 and a spring 62 tends to move the part 55 away from the part 59. When the part 55 is separated from the seat on part 57, air may flow from the chamber 50 out through a port 64 in the part 55 and into the space 54 between the diaphragms and thence out through the exhaust port 53. A passage 65 in the housing 43 connects the chamber 49 with a passage 66 leading from the chamber 60, an adjustable valve 67 being interposed between the passages 65 and 66 by means of which the pressure of the air supplied through the passage 45 may be reduced to the desired amount before it enters the chamber 49.

In the device, as shown in FIG. 5, the Bourdon tubes $S^1$ and $S^2$ have been shown, for convenience, as swung away from each other so that they lie in substantially the same plane, although in the apparatus as actually constructed, as hereinafter pointed out, these tubes lie in parallel planes.

In operation, fluid pressure within the vessel W is conducted by the tube T to the input Bourdon tube $S^1$, whose tip 34 moves up or down in response to variations in the processing pressure. The compressed air from the supply at constant pressure enters the passage 45 in the air relay and, flowing through the chamber 60 and the passage 66 is reduced in pressure at the pressure reducing restriction 67 before entering the chamber 49 and passing on to the nozzle 27. Air escapes from the nozzle, whose delivery opening is partially obstructed by the flapper valve F. So long as the process pressure remains constant, a pressure balance is maintained and a constant proportional pressure is transmitted to the devices G, T, S, or the like. However, if the process pressure increase, the tip of the input tube $S^1$ will move upwardly, thus raising the contact wheel 42 slightly and permitting the spring 33 to raise the forward edge of the flapper valve F correspondingly, and the gap between the flapper valve and nozzle is decreased. The pressure within the nozzle system will increase, forcing the large diaphragm 47 downwardly and thus increasing the effective size of the orifice which is controlled by the valve 58a. The air in the chamber 60 will now pass upwardly through this orifice and into the chamber 50, thus increasing the pressure in the feed-back Bourdon tube $S^2$ and also in the pressure transmitting line U. When the pressure in the chamber 50 has increased to the precisely correct value, the feed-back Bourdon tube $S^2$ will have lifted the nozzle 27 sufficiently to have reestablished the normal required gap between the nozzle and the flapper valve and the pressure in the line U will be exactly proportional to the new input pressure. All of these actions occur very rapidly and smoothly so that there is always an exact agreement between the transmitted air pressure and the input pressure from the process. If the input or process pressure now decreases, the reverse action will take place, the lower air pressure in the nozzle pressure system allowing the spring 61 to raise the diaphragms thus decreasing the size of the orifice in the septum 59 and permitting air from the chamber 50 to escape through the exhaust port 53, thus allowing the pressure in the feed-back tube and in the air line U to drop so as again to be in exact agreement with the process pressure.

High suppression in this system is obtained by using a heavy walled feed-back tube $S^2$ which will produce the full scale output pressure variation of from 3 to 15 p.s.i. for a small motion of the flapper valve. By this means it is possible to measure a small part of the normal tip travel of the input tube $S^1$ and thus a small pressure change in the input tube can be amplified to produce a full scale output of from 3 to 15 p.s.i.

Since the suppression spring 37 is of a material which does not change its load because of a change in temperature, variations in the ambient temperature surrounding the instrument does not affect the accuracy of transmission. Desirably, the spring is adjusted by turning the screw 39, so to load the tip of the tube $S^1$ that it will normally occupy substantially the position which it would occupy if the internal pressure were zero. This eliminates the large temperature error which would result if the tube were allowed to deflect over its full range and only a small part of this deflection were amplified, and also reduces stress in the tube by limiting its motion. A fixed stop 70 is arranged to prevent this spring 37 from deflecting the tube beyond its position when there is no pressure in the tube.

In the commercial embodiment of the invention, (FIGS. 1 to 4 inclusive) the character $B^1$ designates a base plate upon which the operative elements of the apparatus are mounted, while the character $C^1$ designates a cover for enclosing the operative instrumentalities. This cover rests upon the base plate and is removably secured in place by the knurled screw $R^1$.

Mounted upon the base plate $B^1$ is a block 24x, or its equivalent, corresponding to the block 24 above described, to which the air relay assembly R is attached. In the commercial embodiment some, at least, of the passages which in FIG. 5 are shown as formed within the blocks 24 and 43, are provided by tubes 45x, 30x, etc., external to the block 24 but it will be understood that these tubes provide the same channels for the flow of air as do the passages formed in the blocks as above described.

Figure 4:
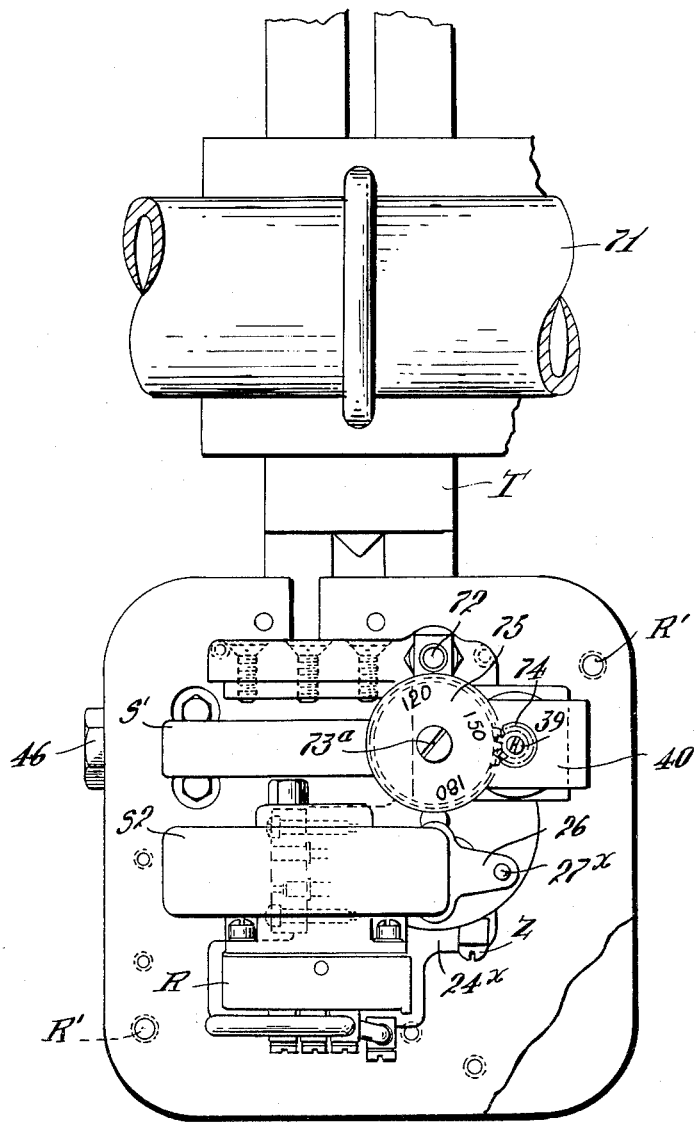
FIG. 4 is a plan view of the transmitter with the cover broken away, but to smaller scale than FIG. 2.

The base plate $B^1$ is provided with a supporting bracket T (FIGS. 2 and 4) of appropriate type for mounting the transmitter upon a desired support, for instance, as illustrated in FIG. 4 for mounting the transmitter upon a pipe 71.

A rigid post 72, secured at its lower end to the base block 24x supports a rigid block 73 at its upper end to which a horizontal upper arm of the bracket 40 is secured. The block 73 is provided with a screw-threaded opening for the reception of a pivot stud 73a (FIG. 4) on which is mounted a dial 75, provided with gear teeth at its edge which mesh with the teeth of a pinion 74 secured to the upper end of the adjusting screw 39. The dial may be marked after the instrument is calibrated to indicate the range adjustment. As shown in FIG. 2, the nozzle 27 is mounted for vertical adjustment on a screw-threaded post 27x projecting downwardly from the bracket 26 carried by the free end of the feed-back tube $S^2$. This is desirable in calibrating the instrument.

As above described, the flapper valve F is mounted to permit it to be turned about a vertical axis and the screw Z (FIGS. 2, 3 and 4) is provided for so turning the flapper valve F. The ratio of the distance between the point of contact of the wheel 42 with the flapper valve and the horizontal pivot line of the flapper, and the distance between the nozzle tip 27 and said pivot line, determines the span of the instrument. For example, if these distances are equal and a 1/8" movement of the tip of the tube $S^1$ were to require a corresponding 1/8" movement of the tube $S^2$ to maintain a predetermined air gap between the end of the nozzle and the flapper valve, then if, for example, the output pressure in the tube U should be to high for a given input pressure, it can be corrected by rotating the flapper valve by means of the screw Z, so that the distance between the contact wheel and the pivot line of the flapper valve is increased while the distance between the nozzle tip and said line is decreased, for example, so that a ⅛″ motion of the tip of the tube S² requires only ³⁄₃₂″ movement of the tip of the tube S², thereby lowering the output pressure so that it corresponds to the input pressure.

While one desirable embodiment of the invention has herein been illustrated and described by way of example, it is to be understood that the invention includes any and/or all modifications or equivalents within the scope of the appended claims.

I claim:

1. A pressure transmitter of the kind which comprises an input Bourdon tube of stainless steel and a feedback Bourdon tube of a material whose modulus of elasticity varies approximately 2% for each 100° F. change in temperature, said transmitter having a suppression ratio of the order of 20, in combination, means operative so to modify motion of the tip of the input tube as to prevent any motion of said tip in response to increase in internal pressure until after said pressure has reached a definite determined value, said motion-modifying means comprising a spring connected to the tip of the input tube and which is so normally stressed as to oppose motion of said tip in response to increase in pressure, said spring being of a material having a substantially constant modulus of elasticity with respect to temperature variations.

2. In combination with a Bourdon tube of a material which is highly resistant to corrosion but whose modulus of elasticity varies approximately 2% for each change of 100° F. in temperature, a bracket fixed to the tip of said tube, said bracket constituting an abutment for one end of a compression spring, an adjustable abutment for the other end of said spring, and means for adjusting the latter abutment thereby to vary the stress imposed by the spring upon the tube tip, said spring being so normally adjusted to load the tip of the tube so as to prevent the latter from moving, in response to increasing internal pressure, until the pressure has reached a predetermined amount, the spring being of a material having a substantially constant modulus of elasticity with respect to temperature change, and constituting the only external means for modifying motion of the tube tip.

3. The combination according to claim 2, wherein the spring gradient of the spring is very low in relation to the spring gradient of the Bourdon tube, whereby, when the internal pressure has increased to the point at which the tip of the tube begins to move, its amount of motion in response to a unit increase in pressure will not differ substantially from that which it would have were it not externally loaded.

4. A transmitter of the kind wherein a conventional input Bourdon tube of a material which is resistant to corrosion, but whose modulus of elasticity changes with temperature variation at a rate of approximately 2% per 100° F. change in temperature, receives variable input fluid pressure, and wherein an air relay, which is supplied with air at a substantially constant pressure, delivers air to a nozzle, and wherein a second Bourdon tube, constituting a feed-back motor, is operative to move the nozzle toward and from a flapper valve thereby to determine the effective air pressure at any instant for operating said feed-back motor, and wherein the position of the flapper valve is controlled by said input Bourdon tube, characterized in having means operative so to control the motion of the tip of the input Bourdon as substantially to nullify the effect upon said last-named tube of temperature variations to which said tube may be subjected.

5. A transmitter of the kind wherein an input Bourdon tube of a material which is highly resistant to corrosion but which has a high coefficient of thermal change of modulus receives variable input fluid pressure, and wherein an air relay, which is supplied with air at substantially constant pressure, delivers air to a nozzle, and wherein a second Bourdon tube, constituting a feed-back motor, is operative to move the nozzle toward and from a movable flapper valve thereby to determine the effective air pressure at any instant for operating said feed-back motor, and wherein the position of the flapper valve is controlled by the input Bourdon tube, characterized in having control means operative to load the tip of the input Bourdon tube and thereby prevent motion of said tip in response to increase in the input fluid pressure until said pressure has reached a predetermined value, but which permits motion of said tube tip in response to increase in input pressure above said predetermined value, said control means being operative substantially to nullify the effects of temperature variations upon said input Bourdon tube.

6. A transmitter according to claim 5, further characterized in that said loading means comprising a spring of a material having a substantially constant coefficient of thermal expansion within the range of temperatures to which the transmitter may be exposed.

7. A transmitter according to claim 6, wherein the tip of the Bourdon tube has a seat for the lower end of the spring and an adjustable abutment contacts the upper end of the spring, said adjustable abutment being operative to vary the spring pressure which opposes motion of the tube tip.

8. A transmitter according to claim 6, further characterized in having means operative positively to limit motion of the tube tip in response to the load imposed on the spring.

9. A transmitter according to claim 4 comprising an input Bourdon tube whose tip would normally move progressively and uninterruptedly in response to increasing internal pressure through a pressure range of from O to M p.s.i., characterized in that the control means is operative to prevent motion of the tip of the input tube until the pressure has risen to the valve K p.s.i. where $$M-K\frac{M}{10}$$

thereby reducing the effect of temperature change upon the motion of the tube tip.

10. A transmitter according to claim 9, further characterized in that $$M-K=\frac{M}{20}$$

and the control means comprises a spring of Ni-Span C arranged to oppose motion of the tube tip in response to increase in pressure.

11. A pressure transmitter of the kind which comprises an input Bourdon tube and a feedback Bourdon tube, the input tube, at least, being of a material which is highly resistant to corrosion and both of said tubes being of a material whose modulus of elasticity varies approximately 2% per 100° F. change in temperature, said transmitter being of a design such as to have a suppression ratio of the order of 20 which would normally result in a temperature error of 40% per 100° F. and, in combination therewith, means operative automatically to prevent such temperature error comprising a motion-modifier for the tip of the input tube operative to prevent motion of said tube in response to increase in internal pressure until after such internal pressure reaches a predetermined value, said motion-modifier being of material whose modulus of elasticity is substantially constant regardless of changes in temperature.

12. A pressure transmitter according to claim 11, wherein the motion-modifier comprises a compression spring of Ni-Span C, arranged to apply opposing force to the tip of the input tube, and means for varying the forces applied by the spring.

13. A pressure transmitter having a pressure range of from Z p.s.i. to M p.s.i. while producing a full scale response at a receiver according to the suppression ratio $$\frac{M}{S}$$

(where the span "$S$" $= M$ p.s.i. $- Z$ p.s.i.) and which comprises an input Bourdon tube having a tip travel of D inches for the full input pressure range of from O p.s.i. to M p.s.i., so that its tip travel X, in inches, for the span S is $$\frac{DS}{M}$$

and a feedback Bourdon tube having a tip travel, in inches of $$\frac{DS}{M}$$

in response to the full output pressure range, and wherein each of the Bourdon tubes is of a material whose modulus of elasticity varies at the rate of approximately 2% for each 100° F. of temperature increase, and where the input Bourdon tube, at least, is of a material which is highly resistant to corrosion, in combination, means operative so to modify the normal response of the input Bourdon tube to increase the internal pressure that its tip does not move from the position of O pressure, in response to increase in pressure, until said pressure equals Z p.s.i., but may move normally in response to pressure increase above Z p.s.i., said motion-modifying means being of a material whose modulus of elasticity is substantially unaffected by variations in temperature within the range of the transmitter.

References Cited in the file of this patent

UNITED STATES PATENTS

| | | |
|---|---|---|
| 2,387,909 | Ingham | Oct. 30, 1945 |
| 2,639,616 | Tate | May 26, 1953 |

UNITED STATES PATENT OFFICE
CERTIFICATE OF CORRECTION

Patent No. 2,999,508                          September 12, 1961

Robert C. Du Bois

It is hereby certified that error appears in the above numbered patent requiring correction and that the said Letters Patent should read as corrected below.

Column 10, lines 40 to 42, the mathematical formula should appear as shown below instead of as in the patent:

$$M-K< \frac{M}{10}$$

Signed and sealed this 31st day of July 1962.

(SEAL)
Attest:

ERNEST W. SWIDER
Attesting Officer

DAVID L. LADD
Commissioner of Patents